(12) United States Patent
Holdsworth et al.

(10) Patent No.: US 8,959,246 B2
(45) Date of Patent: Feb. 17, 2015

(54) METHOD AND COMPUTER PROGRAM FOR A MEDIATION PROCESSING NODE TO UPDATE A MESSAGE

(75) Inventors: Simon Antony Holdsworth, Hants (GB); Gregory Louis Truty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1339 days.

(21) Appl. No.: 12/274,402

(22) Filed: Nov. 20, 2008

(65) Prior Publication Data

US 2009/0132672 A1    May 21, 2009

(30) Foreign Application Priority Data

Nov. 21, 2007   (EP) ..................................... 07121223

(51) Int. Cl.
*G06F 15/16* (2006.01)
*H04L 29/08* (2006.01)
*H04L 29/06* (2006.01)
*H04L 12/58* (2006.01)

(52) U.S. Cl.
CPC .............. *H04L 67/28* (2013.01); *H04L 65/605* (2013.01); *H04L 67/2823* (2013.01); *H04L 12/583* (2013.01); *H04L 51/063* (2013.01)
USPC ............................ 709/246; 709/203; 709/217

(58) Field of Classification Search
CPC ........................... H04L 67/28; H04L 67/2823
USPC .................................... 709/217, 226, 246, 203
See application file for complete search history.

(56) References Cited

U.S. PATENT DOCUMENTS 6,636,855 B2    10/2003   Holloway et al.
7,249,197 B1 *   7/2007   Roestenburg et al. ........ 709/246
2003/0110242 A1 *   6/2003   Brown et al. ................. 709/226

OTHER PUBLICATIONS

EJB Core Contracts and Requirements, JSR 220: Enterprise JavaBeans, Version 3.0, Sun Microsystems, pp. 1-23, May 2, 2006.
EJB 2.1 Entity Bean Component Contract for Bean-Managed Persistence and for Container-Managed Persistence, Chapters 10 and 11, Enterprise JavaBeans, 3.0 Final Release, Sun Microsystems, Inc. May 2, 2006.
Sullivan, Kevin J. et al. "Evaluating the Mediator Method: Prism as a Case Study", IEEE Transactions on Software Engineering, vol. 22, No. 8, Aug. 1996.
Office Action for Chinese Patent Application No. 200810165687 from China Patent Office dated May 19, 2011.

* cited by examiner

*Primary Examiner* — Ramy M Osman
(74) *Attorney, Agent, or Firm* — Winstead, P.C.

(57) ABSTRACT

A mediation processing node computer processor updates a message. A message is received for processing by a mediation processing node computer processor. It is deduced from a declared interface of the mediation processing node computer processor that one or more message values will be updated by the mediation processing node computer processor as a result of its processing. The interface of the mediation processing node computer processor is then used to obtain the one or more updated values and the updates are then applied to the message.

14 Claims, 4 Drawing Sheets

METHOD AND COMPUTER PROGRAM FOR A MEDIATION PROCESSING NODE TO UPDATE A MESSAGE

BACKGROUND OF THE INVENTION

The invention relates to the processing of messages and more particularly to the location of elements within a message.

In a messaging environment, a message producer sends messages to a message consumer, via a messaging system such as one available from IBM Corporation.

One or more mediation service applications may be located within the message processing environment. These intercept and modify messages that are passed between producers and consumers. Thus a mediation may produce a somewhat modified version of an input message as output, where the modification may be to contextual information regarding the routing of the message, the message content, or read-only in the case of a logging or monitoring mediation (mediation processing node computer processor).

Mediation implementations require access to some part of the message content in order to perform their function. Typically mediations are given the entire message in some native or canonical format, and left to determine for themselves which parts of the message are to be read and modified. Each mediation implementation is therefore sensitive to the structure of the message given to it, and may have to have specific code to deal with messages from different sources. Such code indicates the location of each element defined by a particular message format. Further, it is not known in advance which values a mediation requires and/or updates.

A mediation typically has a number of properties, for example values that may be set to indicate information that a mediation requires in order to perform its processing. Injection is a term of the art which covers the setting of the mediation properties from values that are determined by the runtime based on metadata associated with that mediation. Usually these injected properties represent configuration parameters or references to other objects (e.g. other Enterprise Java™ Beans) that a mediation processing node's runtime creates. (Java and all Java-based trademarks are trademarks of Sun Microsystems, Inc. in the United States, other countries, or both.)

The Enterprise Bean Programming Model 2.0 allows an EJB object to comprises a number of properties which may be retrieved and updated. The EJB object may be persisted in the form of a database record. Equally the database record may be reconstituted into the EJB object. The aim is to achieve synchronization between the two. It is however not possible to deduce upfront which of the EJB properties are going to be updated.

U.S. Pat. No. 6,636,855 discloses a system for processing a data flow. Input mappings are provided for extracting values to act as input parameters to a stored procedure. Output mappings are also provided which describe how to supplement a message with output parameters returned from a stored procedure.

BRIEF SUMMARY OF THE INVENTION

According to a first aspect, there is provided a method for a mediation processing node computer processor to update a message, comprising: receiving a message for processing by a mediation processing node computer processor; deducing from a declared interface of the mediation processing node computer processor that one or more message values will be updated by the mediation processing node computer processor as a result of its processing; using the interface of the mediation processing node computer processor to obtain the one or more updated values; and applying the updates to the message.

The values to be updated could, for example, be deduced from the names of the declared interface's method calls or could be deduced from additional information exposed by the declared interface.

It may be deduced from the declared interface of the mediation processing node computer processor one or more message values that the mediation processing node computer processor requires in order to do its processing. The interface of the mediation processing node computer processor may be used to obtain the one or more required values from the message.

Once again the required values could, by way or example be deduced from the declared interface's method calls or from additional information exposed by the declared interface.

According to an embodiment, metadata associated with the mediation processing node computer processor is used to locate the required values in the message.

The located required values may be passed to the mediation processing node computer processor.

According to an embodiment, metadata associated with the mediation processing node computer processor is used to locate each message value within the message which is to be updated.

The type of message may be determined and metadata appropriate to the type of message is accessed.

According to one embodiment, knowledge of the one or more message values that a mediation processing node computer processor will update is used to determine which elements of a message can be stored locally by the mediation processing node computer processor.

The invention may be implemented in computer software.

BRIEF DESCRIPTION OF THE SEVERAL VIEWS OF THE DRAWINGS

An embodiment of the invention will now be described, by way of example only, and with reference to the following drawings.

DETAILED DESCRIPTION OF THE INVENTION

Figure 1:
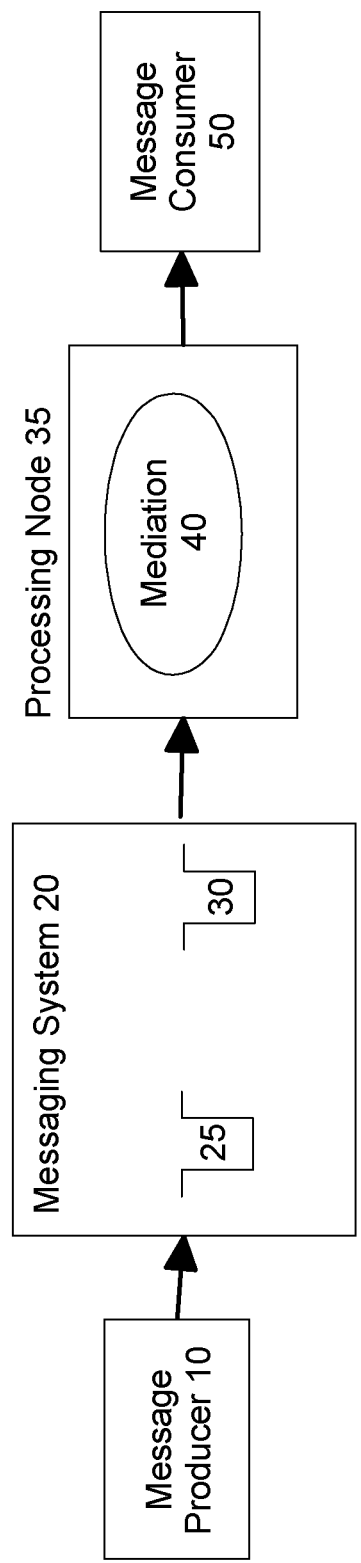
FIG. 1 illustrates a messaging environment in accordance with an embodiment of the invention.

As will be appreciated by one skilled in the art, the invention may be embodied as a method, system, or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the invention may be written in an object oriented programming language such as Java, Smalltalk, C++ or the like. However, the computer program code for carrying out operations of the invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 provides an example of a message processing environment in which an embodiment of the invention may be implemented. A message producer 10 sends messages to a message consumer 50 via messaging system 20. Messages are transferred within the messaging system from an input queue 25 to output queue 30 by a message moving component (not shown).

Message consumer 50 requests the next message on output queue 30 and the messaging system forwards the message on. Processing node 35 is located between messaging system 20 and message consumer 50. This contains a mediation 40 (mediation processing node computer processor) which intercepts the message and does some additional processing using the values contained within the message.

By way of example only, message producer 10 represents a stock quote service. Message consumer 50 requests the current IBM® stock price. The message that messaging system 20 forwards onto message consumer 50, may be the reply to this request.

Message consumer 50 may represent a European client who is interested in the current IBM stock price in Euros as opposed to the US Dollars that it is produced in. Therefore mediation 40 may provide the functionality necessary to convert the stock price retrieved into euros.

Figures 2A, 2B:
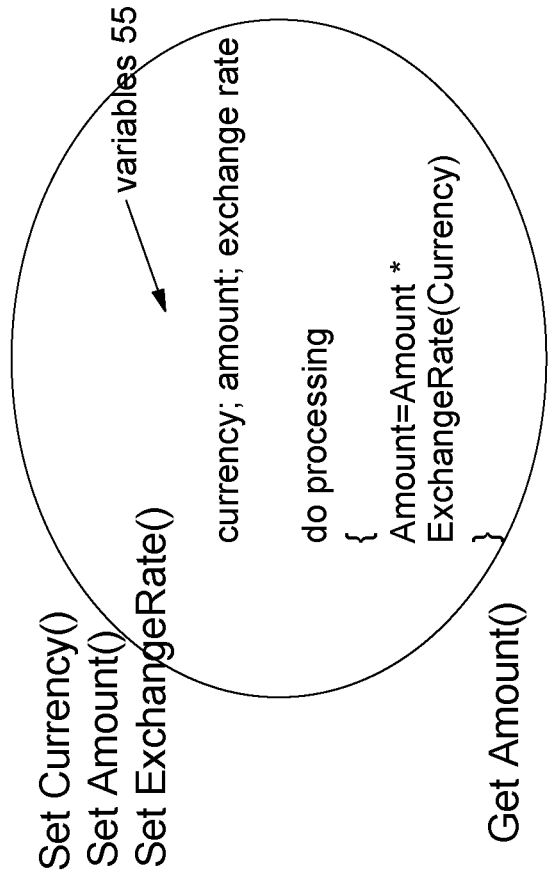
FIG. 2a shows a mediation, in accordance with an embodiment of the invention.
FIG. 2b provide exemplary metadata in accordance with an embodiment of the invention.

FIG. 2a illustrates, in accordance with an embodiment of the invention, the mediation 40 in more detail. The mediation exposes at its declared interface (I/F) 45 a list of "set" and "get" methods. The presence of a set method indicates that the mediation implementation requires the value, whilst the presence of a get method indicates that the mediation implementation modifies the value. In the example, the currency type, amount and exchange rate are the values required (mediation properties representing these values are set via a set method). The amount is also the field in a received message which the mediation updates (the updated value of the mediation property representing this value is retrieved via a get method) as a result of any "do" processing that it contains.

Some metadata 60 is associated with mediation 40. As shown in FIG. 2b this metadata indicates the location (for a particular message format) within a received message of the field values required by the set and get methods exposed at the mediation's interface 45. Thus the metadata shown indicates that the Amount can be retrieved from a message called QuoteResponse and is within the amount field which is located within the y field which is in turn located within field x. Similarly, the Currency is located within the QuoteResponse field which has a currency field located within field z. The exchange rate can be found at website: exchangerate.com/currencyx_to_euros which by way of example is a website which converts a requested currency into euros. An exemplary QuoteResponse message is illustrated in FIG. 2c.

The metadata is may be ably provided with the mediation when it is configured or deployed. As indicated above, such metadata maps specific fields from messages of a particular format (type) to the get and set methods. Such mapping could be achieved by specifying an XPath expression.

Figure 2C:
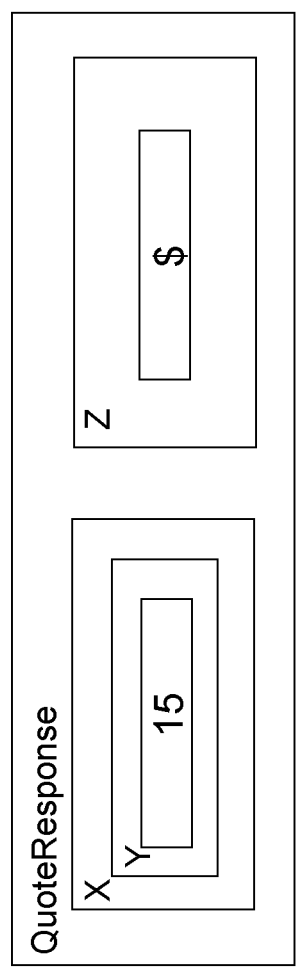
FIG. 2c illustrates an exemplary QuoteResponse message in accordance with an embodiment of the present invention.
Figure 3:
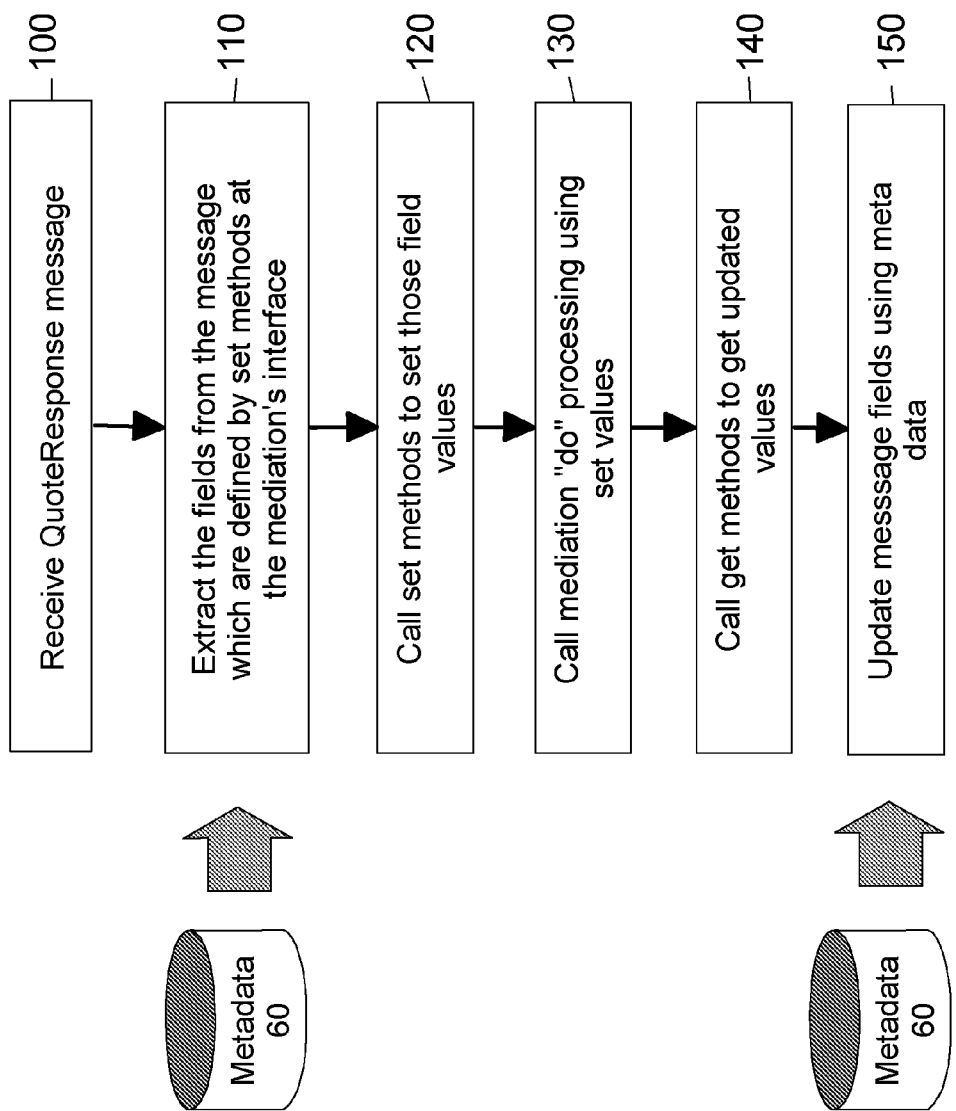
FIG. 3 illustrates the processing of the invention in accordance with an embodiment.

FIG. 3 shows the processing of the invention, in accordance with an embodiment. The figure will now be read in conjunction with the messaging environment of FIG. 1 and the exemplary mediation of FIG. 2a, the metadata of FIG. 2b and the message of FIG. 2c.

At step 100, the QuoteResponse message of FIG. 2c is received by the runtime (not shown) of processing node 30. The runtime extracts the fields from the message which are defined by the set methods of the mediation's interface (step 110). Metadata 60 is used to determine the location of the necessary fields within a received message. In a system which manipulates messages of a variety of formats, it may be necessary to determine the format (type) of a received message and consequently the appropriate metadata to use.

At step 120 the set methods (Currency, Amount, ExchangeRate) of mediation 40 are called by processing node 35's runtime. In this way currency, amount and exchange rate variables (properties) 55 within mediation 40 are set to the values contained within the extracted fields. In this example the currency is US Dollars, the amount is 15 and the exchange rate (as retrieved from www.exchangerate.com/currencyx_to_euros) for converting from USD to Euros is 1.42.

The names of the variables required (i.e. those used in the mediation's "do" processing and specified in the metadata) can be derived from the names of the set and get methods exposed at the mediation's interface. Alternatively such additional information can be exposed at the interface itself.

At step 130, the runtime calls the mediation's "do" processing using the "set" values (properties). The exemplary do processing multiplies the amount (15) by the exchange rate for the required currency (e.g. euros; 1.42).

Any get methods are then called at step 140 to extract any updated values (properties) produced as a result of the do processing. In this instance the mediation's do processing has returned a new value for amount (15*1.42=21.30). Thus this is the value extracted and at step 150 relevant message fields (in this case the amount field) are updated. Metadata 60 is used to locate the amount field directly without the need to parse the whole message.

At step 160, the QuoteResponse message is forwarded onto message consumer 50.

Thus an interface on mediation implementations is provided which exposes the properties that the mediation will require (via set methods), along with the properties that the mediation will update (via get methods) as a result of its "do" processing. The runtime infrastructure can then call those methods appropriately, along with metadata, specified separately, that maps message fields in particular concrete message formats (schemas) to mediation properties.

This provides an extremely simple mediation programming model which allows the mediation to be coded independently of message origin (format), and also provides complete information on which message fields are to be accessed and/or modified, which allows for significant optimization. It is no longer necessary to parse out the complete message.

Having the message access separated and defined by metadata means that a single mediation implementation could be reused for a large variety of messages, with different metadata.

Tooling could be provided that generates a skeleton mediation implementation based on a defined set of input/output parameters and their types, with the mediation writer then just having to deal with the mediation logic, and not the message access/update logic.

It will of course be appreciated that the stock quote example giving above is in no way intended to be limiting. Mediations have a variety of uses which include transformation, logging etc. The invention has utility whenever a mediation needs to update values within a message. It should also be appreciated that the location of a mediation may be at one of a number of places within a messaging environment—e.g. at the messaging system itself or co-located with either the message producer or consumer.

The solution disclosed is particularly advantageous in that the processing node's runtime does not need to maintain representations of intermediate message elements. Thus if a mediation property is mapped to message element a/b/c/d/e/f, the runtime only has to create a representation of f. Previously it was necessary to store a complete representation of the message and this is less efficient. To explain in more detail: When an element is read, then the value of that element needs to be held in some form and given to the mediation component. However it is not necessary to make a copy of that element when the absence of a get method indicates the mediation does not update the value. Without the solution disclosed, typically a copy of the entire message would have had to be made whenever a mediation is called just in case the mediation updates any of the values.

It should be appreciated that the invention is not limited to a system in which a mediation both requires one or more values from a message and also updates one or more values in a message. A system in which a value is only updated is equally possible.

It should further be appreciated that metadata may be accessed each time a message is received in order to locate an appropriate field within the message. Alternatively, the processing node may remember the location of the various fields within a message when the message is one of a frequently received type.

As discussed above, from the mediation's (mediation processing node computer processor) declared interface it is possible to deduce the message values that will be updated. By way of example, this is advantageous in that it is possible to use this knowledge to determine whether a copy of the particular message element and its value need be stored. For example, there may be a chain of mediations and without this knowledge it would typically be necessary to store a representation of the complete message locally for each mediation. Now the specific message element (field) required need be stored locally and then only when that element is being updated.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for a mediation processing node computer processor to update an electronic message, comprising:
   receiving an electronic message for processing by the mediation processing node computer processor;
   deducing from a declared interface of the mediation processing node computer processor that one or more message values will be updated by the mediation processing node computer processor as a result of its processing;
   obtaining one or more updated values using the interface of the mediation processing node computer processor; and
   applying the updates to the message.

2. The method of claim 1 further comprising:
   deducing from the declared interface of the mediation processing node computer processor one or more message values that the mediation processing node computer processor requires in order to do its processing;
   obtaining one or more required values from the message using the interface of the mediation processing node computer processor.

3. The method of claim 2, the step of using the interface of the mediation processing node computer processor to obtain the one or more required values from the message further comprising:
   locating the required values in the message using metadata associated with the mediation processing node computer processor.

4. The method of claim 3 further comprising:
   passing the located required values to the mediation processing node computer processor.

5. The method of claim 3, the step of applying those updates to the message further comprising:
   locating each message value within the message to be updated using metadata associated with the mediation processing node computer processor.

6. The method of claim 5 further comprising:
   determining the type of message; and
   accessing metadata appropriate to the type of message.

7. The method of claim 5 further comprising:
   determining which elements of a message are to be stored locally by the mediation using processing node computer processor from the one or more message values that will be updated.

8. A computer program product disposed on a non-transitory computer-readable storage medium when read by a mediation processing node computer processor for a mediation processing node computer processor to update a message comprising:
   computer-readable program code configured to receive a message for processing by a mediation processing node computer processor;
   computer-readable program code configured to deduce from a declared interface of the mediation processing node computer processor that one or more message values will be updated by the mediation processing node computer processor as a result of its processing;
   computer-readable program code configured to obtain the one or more updated values at use the interface of the mediation processing node computer processor; and
   computer-readable program code configured to apply the updates to the message.

9. The computer program product of claim 8 further comprising:
   computer-readable program code configured to deduce from the declared interface of the mediation processing node computer processor one or more message values that the mediation processing node computer processor requires in order to do its processing;
   computer-readable program code configured to obtain the one or more required values from the message at use the interface of the mediation processing node computer processor.

10. The computer program product of claim 9 further comprising:
    computer-readable program code configured to locate the required values in the message from use metadata associated with the mediation processing node computer processor.

11. The computer program product of claim 10 further comprising:
    computer-readable program code configured to pass the located required values to the mediation processing node computer processor.

12. The computer program product of claim 11 further comprising:
    computer-readable program code configured to locate each message value within the message which is to be updated from use metadata associated with the mediation processing node computer processor.

13. The computer program product of claim 12 further comprising:
    computer-readable program code configured to determine the type of message; and
    computer-readable program code configured to access metadata appropriate to the type of message.

14. The computer program product of claim 13 further comprising:
    computer-readable program code configured to determine which elements of a message need to be stored locally from use knowledge of the one or more message values that the mediation processing node computer processor will update.

* * * * *